Sept. 2, 1941.        W. KAPLAN        2,254,370
FRACTIONATING TOWER
Filed July 29, 1938
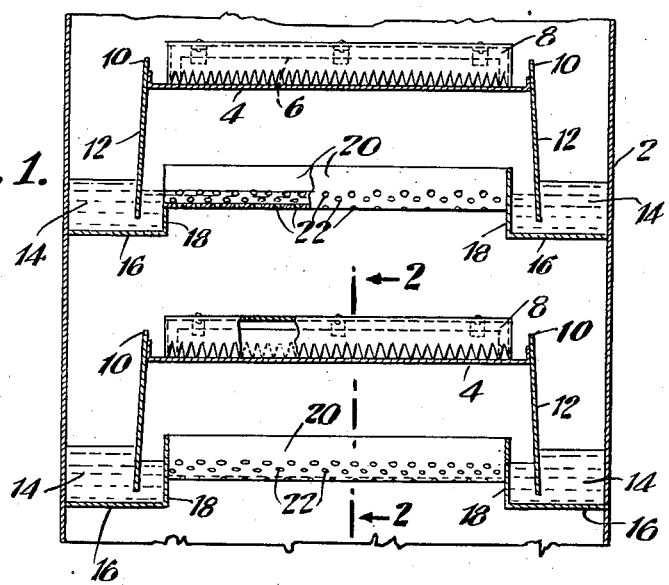
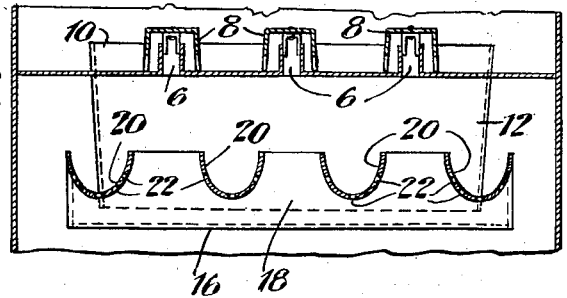
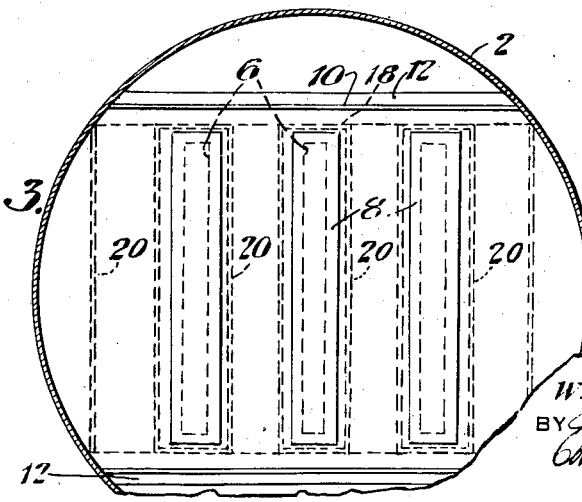
INVENTOR
WILLIAM KAPLAN
BY
ATTORNEY Patented Sept. 2, 1941

2,254,370

UNITED STATES PATENT OFFICE 2,254,370

FRACTIONATING TOWER

William Kaplan, Malverne, N. Y., assignor to Cities Service Oil Company, New York, N. Y., a corporation of Pennsylvania Application July 29, 1938, Serial No. 221,905

8 Claims. (Cl. 261—114)

This invention relates to an improvement in vapor fractionating towers such as those used in oil refining processes, and more particularly to towers of the class known as bubbler towers.

The improvement is particularly applicable to rectifying towers used for treating and processing petroleum vapors, but the improvement may be applied in any art where it is desired to bring a gas or vapor into intimate contact with a liquid.

In the usual forms of bubbler towers operating under ordinary design conditions, the fractionating efficiency is generally attributed to the presence of three types of contact zones on each tray, namely: (1) The zone in the vicinity of the slots where the vapor bubbles through the liquid; (2) a froth or foam zone above the liquid, on the tray; and (3) a mist zone above the froth zone.

While properly operated towers of this type are efficient fractionators, their efficiency diminishes if an attempt is made to increase the capacity appreciably, due to the entrainment of mist from one tray to the tray above. Similarly, if the tower is operated at reduced capacity, the efficiency diminishes because the mist zone which is very important tends to disappear. Further, in any vapor liquid contacting apparatus, the resistance of the gas film may be the controlling factor, or it may be the liquid film. Accordingly, towers are designed to either bubble gas through liquid or spray liquid into a gas, depending on whether the gas film or the liquid film is controlling.

The primary object of the present invention is to provide an apparatus for insuring maximum contact between down-flowing reflux liquid and rising vapors in the operation of a fractionating tower.

Another object of the invention is to provide a fractionating tower which will maintain its efficiency over a wide range of capacity.

Another object of the invention is to provide an apparatus that gives a uniform distribution of the reflux that comes in contact with rising vapors in a bubbler type column.

A still further object of the invention is to provide a gas and liquid contact apparatus which can be used for operations in which either the gas film or the liquid film resistance is controlling.

With these objects in mind, the improved fractionating tower of the present invention comprises a series of bubbler trays mounted in the tower over which a liquid flows, means for causing the liquid to flow downwardly through the tower in series over the trays, a distributor comprising a plurality of perforated troughs mounted beneath each tray, and means for causing the liquid flowing from each tray to pass into these troughs from which the liquid is rained or sprayed into the vapors rising from the next lower tray.

Other objects, features and advantages of the present invention will be apparent to those skilled in the art from the following more detailed description thereof taken in connection with the accompanying drawing which illustrates the invention in connection with a cylindrical tower.

In the drawing:

Fig. 1 is a vertical sectional view of a broken portion of a bubbler plate tower showing an arrangement of bubbler trays and distributor units constructed in accordance with the invention.

Fig. 2 is a cross sectional view of a portion of the apparatus shown in Fig. 1, taken on the line 2—2.

Fig. 3 is a plan view of the apparatus shown in Fig. 2, looking down from above the figure. In all figures of the drawing, like reference characters refer to the same or corresponding parts of the apparatus.

Referring to the drawing the cylindrical shell of the fractionating tower is shown at 2. A series of bubbler trays 4 are mounted within the tower and are supported by any of the conventional means. Each bubbler tray includes vapor risers 6, bubbler caps 8, held in place by brackets as shown, and a pair of overflow weirs 10, each of which is provided with a relatively long outwardly sloping skirt 12. The weirs 10 serve to carry the liquid overflow from each bubbler tray to opposite traps or wells 14 that are formed by the side of tower 2, a base plate 16 and a side plate 18. A plurality of distributor conduits or troughs 20, each of which contains a number of small holes or perforations 22, are set in the opposite plates 18, so that the ends of the elements 20 open into the traps 14. Liquid overflow from each bubbler tray 4 flows over the weirs 10, down the skirts 12 which extend into the respective traps 14 to a point below the liquid level therein. The ends of the weirs 10 and sides of the skirts 12 are sealed against the side of the tower 2. As the reflux flows into the trap 14 a liquid level will be developed in each trap outside the skirt 12 which is proportional to the drop in pressure of the vapors passing through the associated bubbler tray. Reflux liquid contained in traps 14 flows into the distributors 20, comprising a distributor unit for the tray from which it is sprayed or rained through perforations 22 into the vapors rising from the next lower bubbler tray. From the showing in Figs. 1 and 2, it will be noted that the distributors 20 are mounted in a position adapted to spray or rain liquid directly into the vapors discharging from the bubbler caps below.

In operating the fractionating tower equipped with bubbler trays and liquid distribution units of the type shown, vapor or gas rises in a generally upward direction through the column. At the same time liquid flows downwardly through the tower, and the level of the liquid on each bubbler tray will be fixed by the weirs 10. The liquid in its downward passage will flow over the weirs 10 along the skirts 12 and then into the seals or traps 14. The reflux or liquid flows under the skirts 12 into the troughs 20 then through the perforations 22 in rain-like fashion into the vapors rising from the bubbler tray below. In the column the vapors pass upwardly through the vapor risers 6 through the slots or serrations of the bubbler caps 8, through the rain-spray falling from the perforations 22 of the distributor unit above, and then between and around the distributor troughs 20.

In the preferred form of the apparatus as described, it will be noted that the distributor elements 20 receive the overflow liquid from both sides of the bubbler tray, but the column may be operated suitably with one weir and a one-way flow to the distributors. The spraying or raining of the liquid into the rising vapors will insure an additional intimate contact between the ascending vapors and descending liquid in connection with each tray. The number of troughs and the size and number of perforations or holes in each trough may be varied to suit particular needs, and the troughs so designed as to effect uniform distributing of the rain-like spray over the entire tray or bubbler section of the next lower tray. Bubbler caps may cover the entire tray area.

Since the reflux or liquid enters each trough at both ends and there may be a tendency for more of the liquid to pass through the perforations at the end than in the center, due to the natural flow gradient along the trough. To compensate for this effect, the rows of perforations can be arranged, so that the rows slope downwardly toward the center of the trough in conformity with the flow gradient, or the troughs may be sloped downwardly toward the center.

While the column or tower has been described and shown as circular in cross-section it may obviously be square or any other desired shape. Various other modifications may be made in the apparatus within the scope of the invention as defined by the claims.

Having thus described the invention in its preferred form, what is claimed as new is:

1. In a fractionating column, a series of bubbler trays disposed therein and over which a liquid flows, means for maintaining a flow of liquid over the trays and means associated with the trays comprising a plurality of perforated troughs mounted under each tray and adapted to receive liquid therefrom, said troughs extending over the bubbler elements of the next lower tray whereby reflux is sprayed directly into the vapors rising from the next lower bubbler tray.

2. In a bubbler plate column, a series of bubbler trays disposed therein and over which a liquid flows, means for conveying liquid from opposite sides of each bubbler tray, and means comprising a plurality of perforated conduits mounted beneath each tray and adapted to receive the liquid therefrom, said conduits extending over the bubbler elements of the next lower tray and being adapted to spray said liquid directly into the vapors rising from the next lower bubbler tray.

3. A gas and liquid contact apparatus, comprising a column, a series of bubbler trays disposed therein and over which a liquid is adapted to flow, a pair of weirs forming a part of each bubbler tray for overflow of liquid therefrom, and means associated with said bubbler tray extending over the bubbler elements of the next lower tray for spraying the liquid overflow from said weirs directly into intimate contact with gas rising from the next lower bubbler tray.

4. A gas and liquid contact apparatus comprising a column, a plurality of bubbler trays disposed therein and over which a liquid is adapted to flow, means for conducting liquid from each bubbler tray to the next lower tray, said means including a plurality of perforated conduits mounted under each tray and adapted to receive liquid therefrom, said conduits extending over the bubbler elements of the next lower tray whereby liquid is sprayed directly into the vapors rising from the bubbler elements of the next lower bubbler tray.

5. A gas and liquid contact apparatus, comprising a column, a series of vertically spaced bubbler trays disposed therein and over which a liquid flows, a weir forming a part of each bubbler tray for overflow of liquid therefrom, a trap receiving liquid from said weir and adapted to distribute liquid overflow into a plurality of perforated conduits mounted under each tray, said conduits extending over the bubbler elements of the next lower tray whereby liquid is rained directly into the vapors rising from the bubbler elements of the next lower bubbler tray.

6. A gas and liquid contact apparatus, comprising a column, a plurality of bubbler trays mounted therein and over which a liquid flows, a weir forming a part of one of said bubbler trays, a skirt attached to said weir adapted to carry liquid into a trap formed by the side of the tower and a side plate, a plurality of perforated conduits opening into said trap, said conduits extending over the bubbler elements of the next lower tray through said plate to receive liquid from said trap and adapted to spray said liquid directly into the vapors rising from the bubbler elements of the next lower bubbler tray.

7. A bubbler plate column as defined by claim 2 in which means is provided for distributing liquid conveyed from opposite sides of each tray into the opposite ends of said plurality of perforated conduits.

8. In a bubbler column, a bubbler tray disposed therein and over which a liquid is adapted to flow, means comprising a plurality of perforated conduits mounted directly beneath said tray, a second bubbler tray mounted directly below said conduits, means for conveying liquid from said first-mentioned tray into each of said conduits, said conduits being adapted to receive said liquid and intimately distribute the same directly into the vapors or gases rising from said second bubbler tray, and said conduits being so arranged as to intimately distribute liquid over substantially the entire cross sectional area of said second tray.

WILLIAM KAPLAN.

CERTIFICATE OF CORRECTION.

Patent No. 2,254,370.  September 2, 1941.

WILLIAM KAPLAN.

It is hereby certified that error appears in the printed specification of the above numbered patent requiring correction as follows: Page 2, second column, lines 49, 50 and 51, claim 6, strike out the comma and words ", said conduits extending over the bubbler elements of the next lower tray" and insert the same after "trap" in line 52, same claim; and that the said Letters Patent should be read with this correction therein that the same may conform to the record of the case in the Patent Office.

Signed and sealed this 2nd day of December, A. D. 1941.

(Seal)

Henry Van Arsdale,
Acting Commissioner of Patents.